United States Patent
Stowell et al.

(10) Patent No.: US 7,410,183 B2
(45) Date of Patent: Aug. 12, 2008

(54) WEIGHT REDISTRIBUTION IN FREIGHT TRUCKS

(75) Inventors: Zachary John Stowell, Hagerstown, MD (US); David Stephen Musso, Streamwood, IL (US); Charles Bartlett Stewart, Washington, DC (US); Evan James English, Alexandria, VA (US); Christopher Matthew D'Eramo, Eighty Four, PA (US); Adam Thomas Clavelle, San Francisco, CA (US); Shandor Glenn Dektor, Pittsburgh, PA (US); Jayeon Kim, Elkton, MD (US); Jennifer Crystal Perreira, Pittsburgh, PA (US); Charles Michael Sanford Shaw, Ann Arbor, MI (US); Allan Freas Velzy, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/305,078

(22) Filed: Dec. 16, 2005
(Under 37 CFR 1.47)

(65) Prior Publication Data

US 2006/0181048 A1    Aug. 17, 2006

Related U.S. Application Data

(60) Provisional application No. 60/636,564, filed on Dec. 16, 2004.

(51) Int. Cl.
*B62D 53/06* (2006.01)

(52) U.S. Cl. .................................. 280/149.2
(58) Field of Classification Search ............. 280/149.2, 280/407.1; 180/290, 209, 211, 212
See application file for complete search history.

(56) References Cited

U.S. PATENT DOCUMENTS

| | | | |
|---|---|---|---|
| 1,419,160 A | * | 6/1922 | McKinnon ................... 280/638 |
| 5,346,233 A | | 9/1994 | Moser |
| 5,564,725 A | | 10/1996 | Brazeal |
| 5,658,000 A | * | 8/1997 | Boudreaux ............... 280/149.2 |
| 6,345,832 B1 | | 2/2002 | Ellis |

* cited by examiner

*Primary Examiner*—Faye M. Fleming
(74) *Attorney, Agent, or Firm*—Greenberg Traurig LLP; Mauri A. Sankus

(57) ABSTRACT

The present invention provides a weight redistribution system including an axle carrier slideably engaged along a length of a trailer frame, wherein the axle carrier including a threaded fixture and the trailer frame includes parallel longitudinal beams having a plurality of equally spaced openings; an axle carrier positioning means including a motor means and a threaded shaft mounted to the trailer frame being in rotational engagement with the threaded fixture of the axle carrier; a weight monitoring system integrated into the axle carrier; an axle carrier locking means including at least one extendable pin mounted on the axle carrier for locking engagement into one of the equally spaced openings in the longitudinal beams; and a control interface for displaying data from the weight monitoring system, actuating the axle carrier positioning means, and actuating the axle carrier locking means.

20 Claims, 4 Drawing Sheets

WEIGHT REDISTRIBUTION IN FREIGHT TRUCKS

CROSS REFERENCE TO RELATED APPLICATIONS

This application claims the benefit of U.S. Provisional Application Ser. No. 60/636,564, titled "Weight Distribution in Freight Trucks", filed on Dec. 16, 2004, the disclosure of which is fully incorporated by reference herein.

FIELD OF THE INVENTION

The present application relates to moving tandem axles to properly distribute weight in a freight trailer.

BACKGROUND OF THE INVENTION

The distribution of the weight in a tractor trailer is a serious consideration in today's trucking industry. With a high percentage of trucks reaching the allowable gross vehicle weight of 40 tons, it is important for the weight to be distributed properly to avoid fines and increased road damage, and to maintain proper stability. At the same time, however, necessary repetitions of weighing and redistributions can be timely and expensive.

A significant problem with the current method of weight distribution is in the movement of the rear tandem axles. This solution, however, is riddled with problems that greatly decrease efficiency. The first step, the removal of the locking pins, is a time intensive procedure typically requiring more than one person if the locking pins are stuck or corroded in place. The second step, the movement of the trailer over the tandems, involves repeated iterations and trips to and from the trailer to get the locking pins lined up properly in the correct locations. This cycle, in addition to frequent trips to a certified scale, can cost valuable time.

In view of the deficiencies in the prior methods of weight redistribution, a need exists for automating the movement of the tandem trailer and actuation of the locking pins in a more efficient manner.

SUMMARY OF THE INVENTION

The present invention resolves the above described deficiencies in the prior art by a system that achieves uniform payload distribution without manual relocation of the rear trailer tandems (axles) or manual activation of the locking pins. The inventive system by reducing the manual labor of the prior art process of weigh redistribution allows for maximized road time. Broadly, the inventive means of relocating the rear trailer tandems (axles) is provided by a weight redistribution apparatus comprising:

an axle carrier slideably engaged along a length of a trailer frame, wherein said axle carrier comprises a threaded fixture; and an axle carrier positioning means comprising a motor mounted at a first end of said trailer frame and a bearing mounted at an opposing end of said trailer frame, said motor and said bearing being connected by a shaft in threaded engagement with said threaded fixture, wherein rotating said shaft in a first directed traverses said axle carrier along a first longitudinal direction of said trailer frame and rotating said shaft in a second direction traverses said axle carrier along a second longitudinal direction of said trailer frame.

In another aspect of the present invention, a system is provided that allows for weight redistribution though an operator controlled interface between a slideably positioned axle carrier, a weight monitoring means, and a means for locking the slideable mounted tandem axle trailer in secure engagement with the trailer frame. Broadly, the inventive system comprises:

an axle carrier slideably engaged along a length of a trailer frame, wherein said axle carrier comprises a threaded fixture and said trailer frame comprises a plurality of axle carrier lock sites;

an axle carrier positioning means comprising a motor means and a threaded shaft mounted to said trailer frame, said threaded shaft being in rotational engagement with said threaded fixture of said axle carrier.

a weight monitoring system integrated in said axle carrier, said weight monitoring system comprising at least one sensor mounted in said axle carrier to correspond to each axle;

an axle carrier locking means comprising at least one extendable pin mounted on said axle carrier, wherein said at least one extendable pin when in an extended position engages one of said plurality of axle carrier lock sites; and a control interface for displaying data from said at least one sensor of said weight monitoring system, actuating said axle carrier positioning means, and actuating said axle carrier locking means.

DETAILED DESCRIPTION OF PREFERRED EMBODIMENTS

Figure 1:
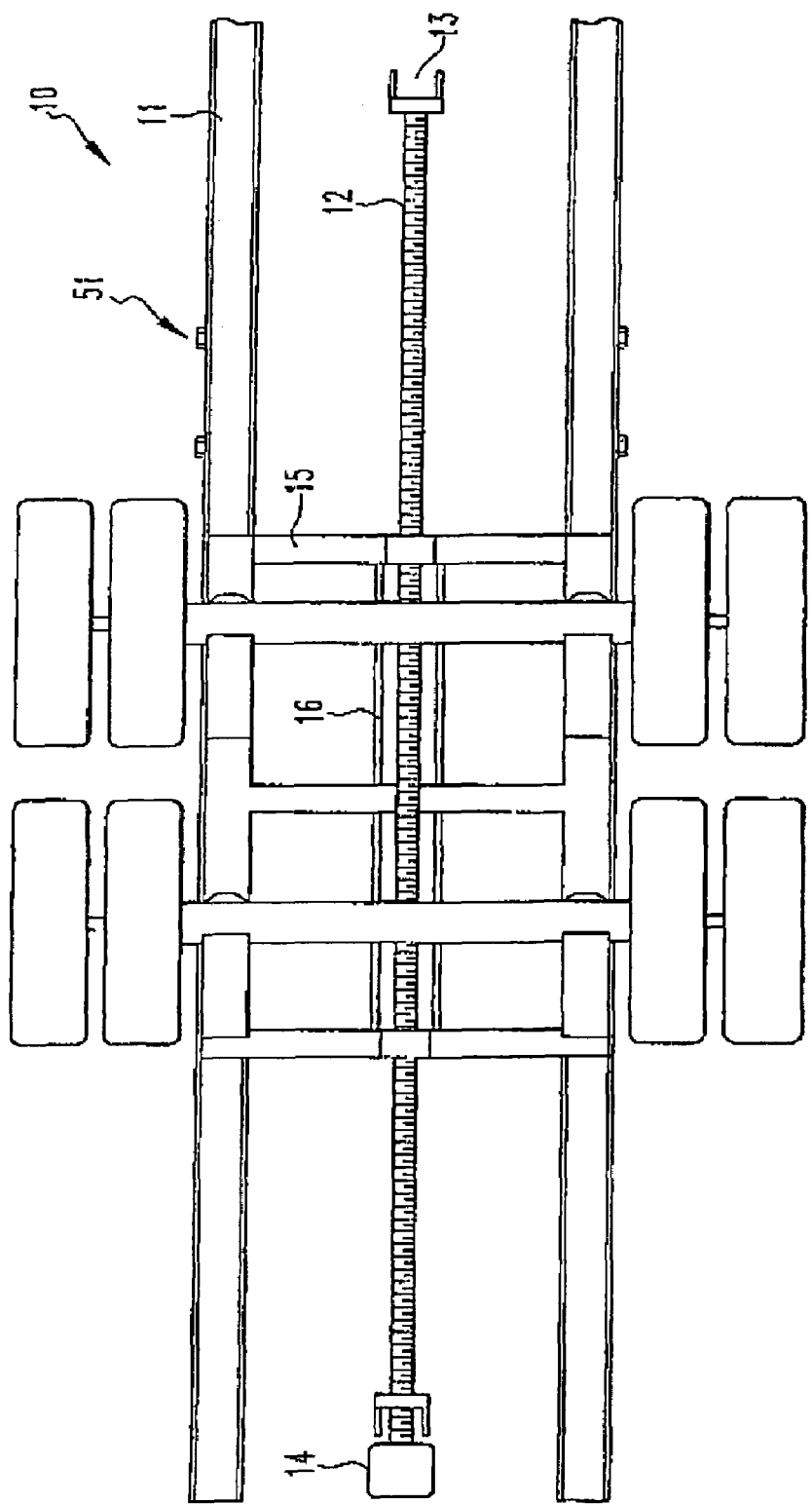
FIG. 1 (top view) depicts one embodiment of a tandem axle carrier that is slideably engaged along the length of a trailer frame having a controllable axle positioning means.

The present invention provides a weight redistribution system that achieves uniform payload distribution without manual relocation of the rear trailer tandems or manual activation of the locking pins. The present invention is now discussed in more detail referring to the drawings that accompany the present application. It is noted that in the accompanied drawings, like and/or corresponding elements are referred to by like reference numbers.

Referring to FIG. 1, trailer frame 10 is depicted having an axle carrier positioning means 11, 12, 13, 14 mounted under the bed of the trailer body (also referred to as box trailer). The trailer frame 10 comprises of longitudinal beams and cross beams running laterally for the entire length of the trailer.

Guide rails 11 are mounted to the crossbeams, on which the axle carrier 15 is traversed along for weight redistribution.

A threaded shaft 12 is one component of the axle carrier positioning means. In a preferred embodiment, the threaded shaft 12 comprises a worm gear. The threaded shaft 12 preferably comprises aluminum, which provides a weight savings and corrosion resistance advantage over alternative metals, such as steel. The axle carrier positioning means may further comprise a motor 14 mounted to one end of the trailer frame 10, which is in rotational engagement with the threaded shaft 12. The motor 14 may be mounted to one of the frames crossbeams. In a preferred embodiment, the motor 14 is electrically powered. In one example, the motor 14 is capable of producing a torque on the order of approximately 500 to 600 lbs-ft.

It is preferred that the axle carrier positioning means further comprises a bearing 13, such as a thrust bearing, mounted to the portion of the frame 10 opposing the motor 14 mount, wherein the bearing 13 is in rotational engagement with the threaded shaft 12. The bearing 12 attachment of the threaded shaft 12 opposite the motor 14 strengthens the system in both a lateral and longitudinal direction. In one embodiment, at least portions of the axle positioning means 12, 13, 14, 16 are encased in a protective structure. Preferably, the protective structure obstructs operator contact to all components of the axle carrier position means, with the exception of access points for maintenance. Although the protective structure preferably comprises aluminum, other metals have also been contemplated and are within the scope of the present invention.

Figure 2:
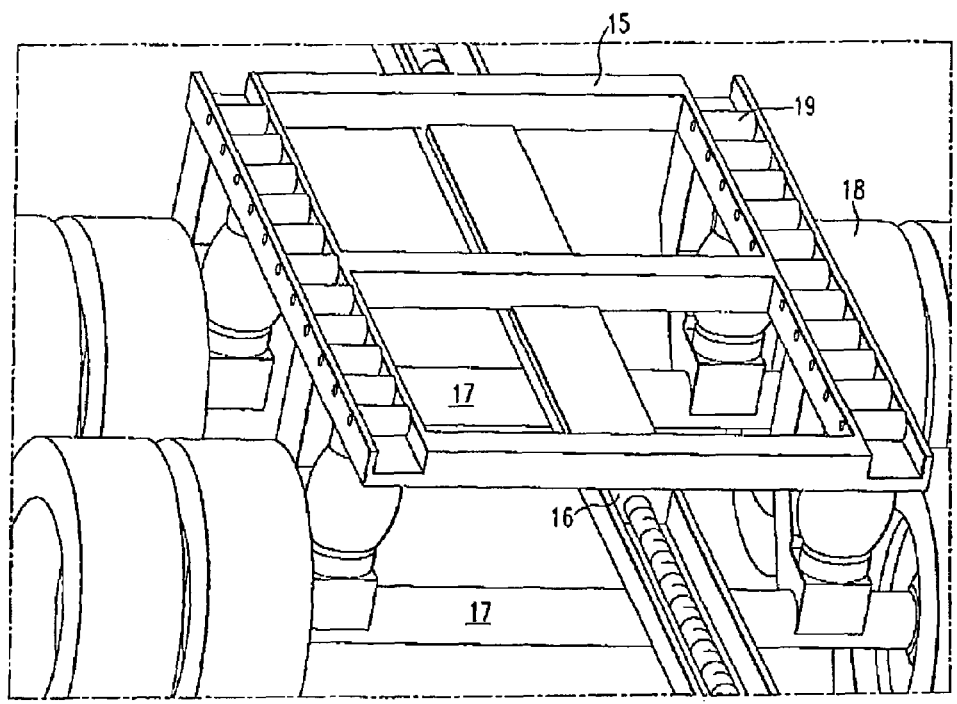
FIG. 2 (prospective view) further illustrates the axle carrier depicted in FIG. 1.

Referring to FIG. 2, the axle carrier 15 is slideably traversed along the guide rails 11 of the trailer frame 10 and is actuated by the axle carrier positioning means 12, 13, 14, 16. The axle carrier 15 and the axle carrier positioning means are threadably engaged between the threaded shaft 12 and a threaded fixture 16 that is mounted on the axle carrier 15. Since several teeth of the threaded shaft 12 (worm gear) and the threaded fixture 16 are engaged simultaneously, the gear system provides greater shear strength than would be possible using rack and pinion gears systems. The axle carrier 15 includes mounting points for at least two axles 17, each of which may include four tires 18 (two on each side for a total of eight). Preferable, the axle carrier 15 comprises aluminum.

Rollers 19 may be integrated into the surfaces of the axle carrier 15 that are in contact with the guide rails 11 and/or trailer frame 10 to decrease the frictional resistance to the movement of the axle carrier 15. In a one embodiment, the rollers 19 may comprise nylon. As opposed to the rollers 19, a low friction strip may be positioned between the surfaces of the axle carrier 15 and the guide rails 11 and/or trailer frame 10 that are in contact. The low friction strips may comprise Teflon, Nylon or any other like low friction material. Brakes may be attached to either end or both ends of each axle. In one example, there are four sets of leaf springs for support (one per side, per axle), and four air shocks. An on-board air compressor (not shown) operates the braking and suspension system.

Figure 3:
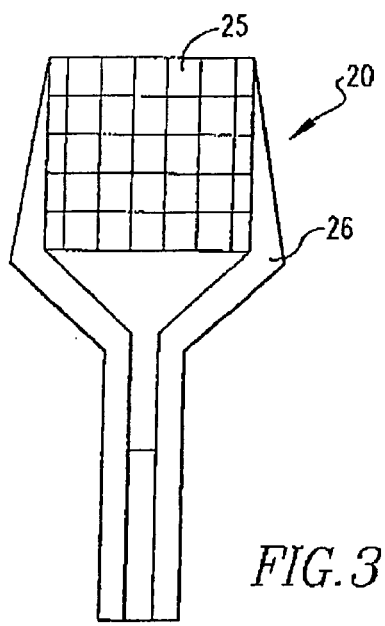
FIG. 3 (top view) depicts one embodiment of a weight monitoring pad for use with the weight monitoring system of the present invention.

Referring to FIG. 3, a weight monitoring system may also be integrated into the axle carrier. In one embodiment, strain gauges 20 may be mounted to a portion of the axle carrier 15 corresponding to each axle 17. In another embodiment, strain gauges 20 are mounted to measure the strain on the axles 17 supported by the axle carrier 15 and additional strain gauges 20 are mounted to the trucks suspension (not shown) to measure the strain on the front and drive axles of the truck that transports the trailer.

In one embodiment, the strain gauge 20 provides a voltage across a very fine wire or metallic foil arranged in a grid pattern. The grid pattern 25 maximizes the amount of metallic wire or foil subject to strain in the parallel direction. The cross sectional area of the grid 25 is minimized to reduce the effect of shear strain and Poisson Strain. The grid 25 is bonded to a thin backing 26, called the carrier, which is attached directly to the test specimen; such as the portions of the axle carrier 17 or truck corresponding to the axles. The strain experienced by the axles is transferred directly to the strain gauge 20, which responds with a linear change in electrical resistance. This change in resistance can be extrapolated to determine the strain in the axles 17. By determining the strain of the axle 17, the weight placed on the axle can be extrapolated.

In a preferred embodiment, the strain gauge 20 consists of a load cell, which is the actual wire or foil 25 that accepts the loads, as depicted in FIG. 3. Preferably, the load cell is protected by an enclosure. The information measured by the strain gauge 20 is processed by software and transferred to a readout station, which will be a part of the operator interface that provides controllability of the axle positioning means, as well as, the axle carrier locking means.

Figure 4:
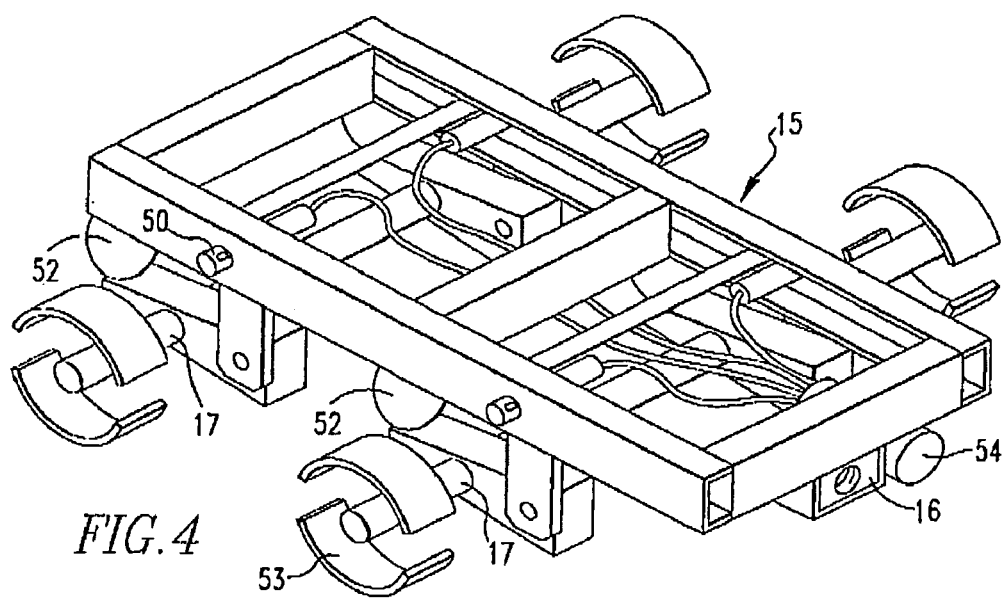
FIG. 4 (prospective view) illustrates an axle carrier having a plurality of pneumatically actuated locking pins.

Referring to FIG. 4, in one embodiment, the inventive weight redistribution system may further comprise an axle carrier locking means. In one embodiment, the axle carrier locking means comprises pneumatically actuated pins 50 that lock the axle carrier into place by engagement of the pins 50 into openings 51 in the trailer frame. For example, equally spaced openings 51, also referred to as locking sites, for the locking pins 50 may be formed along the longitudinal beams of the trailer frame or the guide rails. The axle carrier locking means may draw air pressure from the air brake 53 or air suspension system 52 already on the trailer, and may have a fail-safe system similar to that of the brakes 53.

In one example, the pins 50 are naturally engaged by spring engagement, and need air pressure to disengage and release the axle carrier 15. In this example, should the air system fail, leak, etc., the pins 50 will remain or become engaged, substantially reducing the possibility for the system to release while the truck is in motion. In another embodiment, the pins 50 are naturally disengaged by spring pressure, and need air pressure to engage and lock the axle carrier 15. In one embodiment, a plurality of locking pins may be utilized, such as four locking pins, wherein each locking pin is separately actuated by an individual air piston. Although a pneumatically actuated locking system 54 is preferred, the locking pins 50 may alternatively be actuated by mechanical, hydraulic or electric means.

Figure 5:
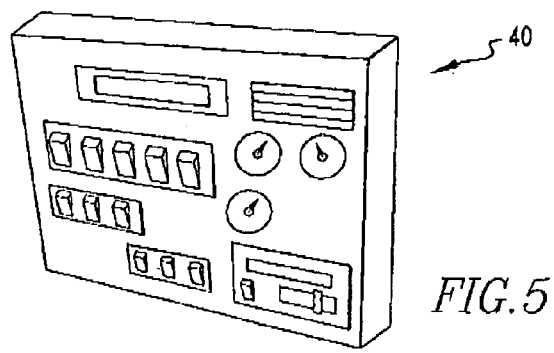
FIG. 5 (prospective view) depicts one embodiment of an operator interface for use with the axle carrier positioning means, the locking pins and the weight monitoring system of the present invention.
Figure 6:
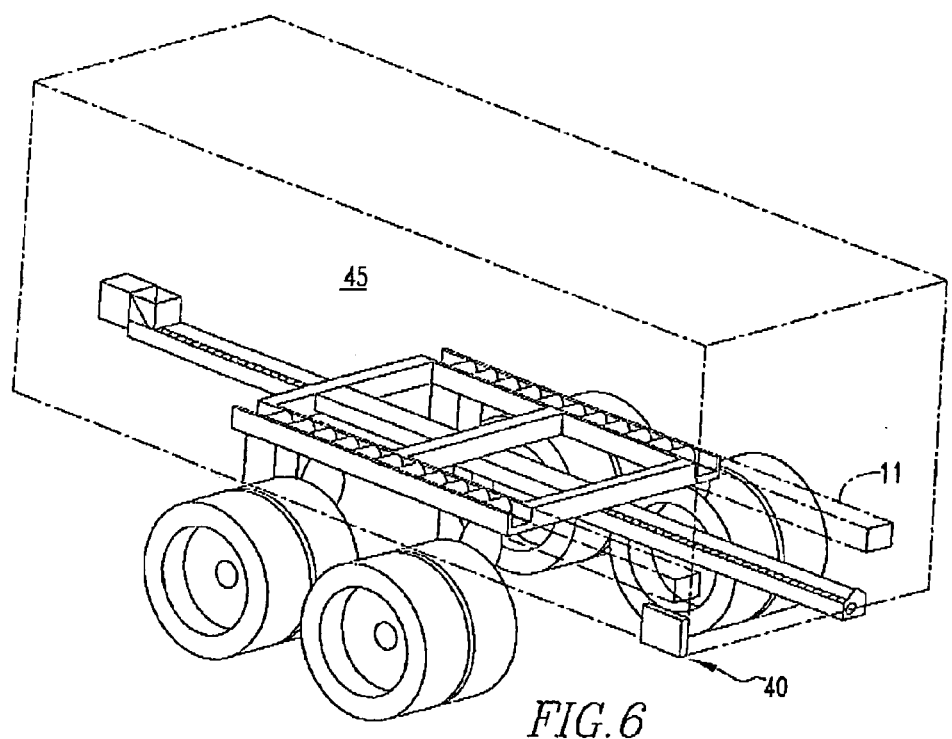
FIG. 6 (prospective view) illustrates the axle carrier and trailer frame depicted in FIGS. 1 and 2 having a trailer freight body mounted to the trailer frame and an operator interface mounted to the trailer freight body.

Referring to FIGS. 5 and 6, each of the above described elements may be integrated by an operator interface 40 facilitating the interaction of the driver with the system. The operator interface 40 could be mounted on the trailer body 45, as depicted in FIG. 6, or be mounted within cab of the truck, as depicted in FIG. 5, or accessible from both. The operator interface 40 may be radio controlled allowing for wireless operation of the system from both inside and outside the truck cab. Regardless of the mounting point, the operator interface 40 preferably provides the operator with the ability to directly monitor and control the axle movement.

Having described the presently preferred embodiments, it is to be understood that the invention may be otherwise embodied within the scope of the appended claims.

What is claimed is:

1. A weight redistribution apparatus comprising:
    an axle carrier slideably engaged along a length of a trailer frame, wherein said axle carrier comprises a threaded fixture; and an axle carrier positioning apparatus comprising a motor fixeably mounted at a first end of said trailer frame and a bearing mounted at an opposing end of said trailer frame, said motor and said bearing being connected by a shaft in threaded engagement with said threaded fixture, wherein rotating said shaft in a first directed traverses said axle carrier along a first longitudinal direction of said trailer frame and rotating said shaft in a second direction traverses said axle carrier along a second longitudinal direction of said trailer frame.

2. The weight redistribution apparatus of claim 1 wherein said axle carrier comprises aluminum.

3. The weight redistribution apparatus of claim 1 wherein said axle carrier comprises at least two axles.

4. The weight redistribution apparatus of claim 1 wherein said trailer frame comprises longitudinal beams and a plurality of cross beams, wherein each of said motor and said bearing are mounted to one of said plurality of cross beams.

5. The weight redistribution apparatus of claim 1 wherein said axle carrier slideably engaged to said trailer frame is guided along said length of said trailer frame by guide rails.

6. The weight redistribution apparatus of claim 1 wherein said axle carrier further comprises rollers positioned at the contract surfaces between said trailer frame and said axle carrier.

7. The weight redistribution apparatus of claim 1 wherein said motor is electrically powered.

8. The weight redistribution apparatus of claim 1 wherein said threaded shaft comprises aluminum.

9. The weight redistribution apparatus of claim 1 wherein said axle carrier positioning apparatus is protectively encased from operator contact.

10. A weight redistribution system comprising:
   an axle carrier slideably engaged along a length of a trailer frame, wherein said axle carrier comprises a threaded fixture and said trailer frame comprises a plurality of axle carrier lock sites;
   an axle carrier positioning apparatus comprising a motor and a threaded shaft mounted to said trailer frame, said threaded shaft being in rotational engagement with said threaded fixture of said axle carrier;
   a weight monitoring system integrated in said axle carrier, said weight monitoring system comprising at least one sensor mounted in said tandem carrier to correspond to each axle;
   an axle carrier locking apparatus comprising at least one extendable pin mounted on said axle carrier, wherein said at least one extendable pin when in an extended position engages one of said plurality of lock sites in said trailer frame; and
   a control interface for displaying data from said at least one sensor of said weight monitoring system, actuating said axle carrier positioning apparatus, and actuating said axle carrier locking apparatus.

11. The system of claim 10 wherein said axle carrier comprises aluminum.

12. The system of claim 10 wherein said at least one extendable pin is pneumatically actuated.

13. The system of claim 11 wherein pneumatic actuation is provided by an air system incorporated with a trucks brake or suspension system.

14. The system of claim 10 wherein at least one extendable pin comprises a plurality of extendable pins, wherein each of said plurality of extendable pins is separately pneumatically actuated.

15. The system of claim 14 wherein said at least one extendable pins are naturally engaged and pneumatic actuation disengages said at least one extendable pin.

16. The system of claim 14 wherein said plurality of lock sites comprises a plurality of openings in longitudinal beams of said trailer frame or a plurality of openings in guide rails on which said carrier axle is slideably traversed along said length of said trailer frame.

17. The system of claim 10 wherein said sensor is a strain gauge comprising wire or metallic foil arranged in a grid pattern, wherein change in electrical resistance of said wire or said metallic foil corresponds to weight.

18. The system of claim 10 wherein said weight monitoring system further comprises at least one weight monitoring sensor corresponding to at least one truck axle in a truck in communication with said trailer frame.

19. The system of claim 10 wherein said control interface is mounted in a cab of a truck or is mounted to a trailer body mounted on said trailer frame.

20. The system of claim 10 wherein said control interface provides wireless communication to said weight monitoring system, said axle carrier positioning apparatus, and said axle carrier locking apparatus.

* * * * *

UNITED STATES PATENT AND TRADEMARK OFFICE
CERTIFICATE OF CORRECTION

PATENT NO. : 7,410,183 B2  Page 1 of 1
APPLICATION NO. : 11/305078
DATED : August 12, 2008
INVENTOR(S) : Zachary Stowell et al.

It is certified that error appears in the above-identified patent and that said Letters Patent is hereby corrected as shown below:

In column 1, line 51, after "of", delete "weigh" and insert --weight--.

In column 2, line 2, after "redistribution", delete "though" and insert --through--.

In column 3, line 44, after "eight).", delete "Preferable" and insert --Preferably--.

In column 3, line 48, after "in", delete "a".

In column 5, Claim 4, line 3, after "wherein", delete "each".

In column 5, Claim 4, line 3, after "wherein", delete "of".

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,410,183 B2
APPLICATION NO. : 11/305078
DATED : August 12, 2008
INVENTOR(S) : Zachary Stowell et al.

It is certified that error appears in the above-identified patent and that said Letters Patent is hereby corrected as shown below:

In column 1, line 51, after "of", delete "weigh" and insert --weight--.

In column 2, line 2, after "redistribution", delete "though" and insert --through--.

In column 3, line 44, after "eight).", delete "Preferable" and insert --Preferably--.

In column 3, line 48, after "in", delete "a".

In column 5, Claim 4, line 17, after "wherein", delete "each of".

This certificate supersedes the Certificate of Correction issued October 14, 2008.

Signed and Sealed this

Fourth Day of November, 2008

JON W. DUDAS
*Director of the United States Patent and Trademark Office*